US009360070B2

(12) United States Patent
Gripemark

(10) Patent No.: US 9,360,070 B2
(45) Date of Patent: Jun. 7, 2016

(54) BRAKE LEVER FOR DRUM BRAKE

(71) Applicant: Haldex Brake Products AB, Landskrona (SE)

(72) Inventor: Joakim Gripemark, Lund (SE)

(73) Assignee: HALDEX BRAKE PRODUCTS AB, Landskrona (SE)

( * ) Notice: Subject to any disclaimer, the term of this patent is extended or adjusted under 35 U.S.C. 154(b) by 56 days.

(21) Appl. No.: 14/252,330

(22) Filed: Apr. 14, 2014

(65) Prior Publication Data

US 2014/0216865 A1    Aug. 7, 2014

Related U.S. Application Data

(63) Continuation of application No. PCT/EP2012/069980, filed on Oct. 9, 2012.

(30) Foreign Application Priority Data

Oct. 14, 2011    (DE) .......................... 20 2011 106 746

(51) Int. Cl.
*F16D 65/56* (2006.01)
*F16D 65/60* (2006.01)
*F16D 125/30* (2012.01)

(52) U.S. Cl.
CPC ................ *F16D 65/56* (2013.01); *F16D 65/60* (2013.01); *F16D 2125/30* (2013.01)

(58) Field of Classification Search
CPC .................... F16D 65/60; F16D 65/56; F16D 65/561–65/563; F16D 65/566; F16D 2125/30; F16D 65/565
See application file for complete search history.

(56) References Cited

U.S. PATENT DOCUMENTS

| 4,440,268 A * | 4/1984 | Karlsson ................ F16D 65/60 188/79.55 |
| 6,408,993 B1 * | 6/2002 | Truuvert ................ F16D 65/60 188/196 BA |

(Continued)

FOREIGN PATENT DOCUMENTS

| EP | 0598290 A1 | 5/1994 |
| EP | 1064472 B1 | 1/2001 |

(Continued)

OTHER PUBLICATIONS

International Search Report Application No. PCT/EP2012/069980 Completed: Jan. 23, 2013; Mailing Date: Feb. 1, 2013 3 pages.

*Primary Examiner* — Vishal Sahni
(74) *Attorney, Agent, or Firm* — St Onge Steward Johnston and Reens LLC

(57) ABSTRACT

A brake lever for a drum brake of a vehicle including a lever section for connection with a brake cylinder and a housing section for attachment to a splined S-cam shaft, which receives an adjustment device, the adjustment device including a first clutch (K1), the first clutch (K1) being biased by a first spring element with a spring force and a second clutch (K2) formed as an one-way clutch with a number of teeth (Z2), the second clutch (K2) being biased by a second spring element with a spring force, in which the teeth (Z2) of the second clutch (K2) are configured such that the spring force applied by the second spring element can shift the second clutch (K2) in its completely closed position against the torques which are induced in it by friction, as long as the first clutch (K1) remains in an open position.

15 Claims, 6 Drawing Sheets

(56) References Cited

U.S. PATENT DOCUMENTS

2007/0137354 A1    6/2007    Botalenko et al.
2010/0122879 A1*   5/2010    Louis .................... B60T 7/108
                                                           188/79.55

FOREIGN PATENT DOCUMENTS

WO      2011016047 A1    2/2011
WO      2011040893 A1    4/2011

* cited by examiner

BRAKE LEVER FOR DRUM BRAKE

FIELD OF THE INVENTION

The present invention relates to a brake lever for a drum brake of a vehicle comprising a lever portion for connection to a brake cylinder and a housing portion for attachment to a splined S-cam shaft, and to a corresponding drum brake.

BACKGROUND OF THE INVENTION

In the prior art, for example from EP 1 064 472 B1 and EP 0 598 290 B1 of the applicant, brake levers and slack adjusters, respectively, are known which have proven to be applicable in practical service. Such brake levers comprise a lever section for connection with a brake cylinder and a housing section for attachment to a splined S-cam shaft which controls both brake linings in the drum. An adjustment device is received by the housing section of the brake lever, which comprises a first clutch, the first clutch being biased by a first spring element with a spring force, and a second clutch, the second clutch being biased by a second spring element with a spring force, as well.

Generally, the second clutch is configured as a one-way clutch and comprises a gear tooth forming with a defined number of teeth.

Although the adjustment accuracy of the automatic slack adjusters according to the prior art could have been further improved in that the adjustment steps of the one-way clutch in the adjustment device have been made smaller, see e.g. WO 2011/016047 A1, or in that even a completely step-less one-way clutch has been employed, by which rather highest requirements on safety and reliability of such systems have been met, however, still there exists the need to further increase the accuracy and repeatability of the adjustment movements, in particular with respect to coming requirements in electronic brake monitoring systems.

In this connection it shall peculiarly better be distinguished between a normal functioning and a malfunction of the entire brake system, and the monitoring and warning function of such brake control mechanisms shall be further increased.

One-way clutches, which do perform very small steps or even function continuously, as described e.g. in WO 2011/016047 A1, do clearly show disadvantages with respect to their strengths, i.e. also with respect to the magnitude of the possible force transmission. Furthermore, their wear resistance as well as their resistance against impurities in the lubricating grease is clearly reduced. Such disadvantages shall be avoided.

SUMMARY OF THE INVENTION

Based on that it is an object of the present invention to provide a brake lever with an integrated adjustment device for drum brakes, for which the adjustment device offers higher adjustment accuracy, in particular in terms of consistent repetition of very small adjustment steps of the clutches utilized by the adjustment device.

According to the invention a brake lever for a drum brake of a vehicle comprises a lever section for connection with a brake cylinder and a housing section for attachment to a splined S-cam shaft, which receives an adjustment device, the adjustment device comprising a first clutch, the first clutch being biased by a first spring element with a spring force, and a second clutch formed as a one-way clutch with a number of teeth, the second clutch being biased by a second spring element with a spring force, in which the teeth of the second clutch are configured such that the spring force applied by the second spring element can shift the second clutch in its completely closed position against the torques which are induced in it by friction, as long as the first clutch remains in an open position.

According to a preferred embodiment of the brake lever according to the invention the teeth of the second clutch comprise such a slope angle that the second clutch can be driven in its completely closed position by means of the spring force acting on it, in which the configuration of the teeth in the second clutch and the configuration of the second spring element are tuned on each other, correspondingly.

By that it is ensured that the smallest possible adjustment steps are performed by the circumferential arrangement and division of the teeth, i.e. by means of their angular offset, in the first clutch, and not, as to now in the prior art, in the second clutch which is formed as a one-way clutch.

The adjustment device which is integrated in the housing section comprises a worm wheel for connection with the splined S-cam shaft and a worm screw in engagement with the worm wheel, on which worm screw a clutch wheel is rotatably supported, which is in engagement with the worm screw via the first clutch under influence of a spring force, in which a control arrangement is provided which applies a control movement onto the clutch wheel subject to the angular position of the brake lever from a defined fixed reference point. Thereby the control arrangement comprises the second clutch.

The invention is directed both to brake adjusters which cannot adjust itself relative to the position of the reference point, and also to automatic brake adjusters, which for that do adjust automatically. For the latter, the control arrangement comprises a control disc, which is coaxially rotatably arranged to the worm wheel and connected to a control ring having a control arm for establishing the reference point by being attached to a fixed part of the vehicle chassis, a pinion meshing with the toothed periphery of the control disc and an adjustment screw, which is coaxial with the pinion and is in toothed engagement with the clutch wheel, in which the axis of the worm screw is perpendicular to the axis of the pinion and of the adjustment screw.

A driver, which preferably is cylindrically shaped, is arranged axially but non-rotatably in relation to the pinion and coaxially therewith and cooperates with the adjustment screw. The one-way clutch preferably is arranged between the driver and a tooth washer, which is connected to the adjustment screw.

The pinion, the driver and the adjustment screw are rotatably arranged on one common shaft. The pinion can be formed as a hollow shaft for receiving the driver, in which furthermore a compression spring is arranged between the pinion and the driver.

An adjustment device with a corresponding control arrangement, for example, is known from EP 1 064 472 B1 of the applicant, to which it is explicitly referred to herewith.

The functioning of the adjustment device of the brake lever according to the invention shall be explained in more detail below.

The clutch wheel, which is rotatably mounted on the worm screw, forms the first clutch with it by means of surfaces comprising teeth. Since the surfaces with the teeth are normally conical, the first clutch is also referred to as conical clutch. The worm screw, and thus for engagement with the conical clutch, is set under pretension by means of a correspondingly dimensioned compression spring.

According to the invention the one-way clutch is designed and configured to be always self-closing independent of all combinations of friction pairs in the adjustment device and of manufacturing tolerances of its single components. In other words, the spring acting on the one-way clutch is at least dimensioned such that frictional resistances, manufacturing tolerances etc. do have no influence and are not able to prevent a self-closing of the second clutch.

Due to the fact that the one-way clutch always closes for each condition as long as the conical clutch is in an open position, it is enabled according to the invention that the conical clutch provides a lining clearance or slack adjustment at the brake pads. During brake release, it closes itself due to a changed teeth grip which later enforces a rotation of the adjustment screw, when the brake release is going to terminate.

The adjustment resulting from the rotating adjustment screw takes place as soon as the lining clearance at the brake pads is excessive with a certain amount. This amount in turn is related to the angular division between the teeth or in other words related to the number of teeth of the conical clutch.

Thus, the adjustment accuracy in theory can be further enhanced by those skilled in the art in that the number of teeth in the conical clutch will be further increased. This, however, is only possible to a limited extent and generally not recommended, respectively, since an increase in the number of teeth in relation to the perimeter would result in smaller teeth which, however, may be less resistant to wear and to impurities of the lubricating grease.

However, in that it is ensured according to the invention that the one-way clutch always closes itself before the conical clutch closes during the return stroke, the influence on the smallest possible adjustment step resulting from the angular division among the teeth in the one-way clutch and from its number, respectively, can be uncoupled, with the result, that the number of teeth of the one-way clutch can be further reduced and its teeth size increased, respectively, whereas the number of teeth of the conical clutch remains. This measure is associated with an increased adjustment accuracy of the device.

With respect to the one-way clutch this means that bigger teeth can be utilized which, together with a cost reduction, are easier to manufacture on the one hand and which comprise an improved teeth strength and a higher wear resistance on the other.

The adjustment performed by the conical clutch takes place at that point, when the conical clutch has rotated from its original teeth-top in teeth-bottom engagement, at which the teeth tops are in engagement with the corresponding bottoms of the respective opposite teeth, at least to a teeth-top to teeth-top contact, in which the teeth-tops of the teeth are in contact with the teeth-tops of the respective opposite teeth. From this position then the conical clutch can slide, according to the sense of rotation, into the next adjacent teeth-top to teeth-bottom grip, in which the teeth-tops are again in engagement with the corresponding bottoms of the respective following tooth pair, and thus, the clutch closes itself.

This top-to-top position, in which the teeth-tops are in contact with the teeth-tops of the respective opposite teeth, corresponds to a clutch wheel rotation of $360/(2*Z1)$ degrees and to an adjustment screw rotation of $U*360/(2*Z1)$ degrees, in which $Z1$ is the number of teeth of the conical clutch and U is the gear ratio between the clutch wheel and the adjustment screw which is defined by $U=Z3/Z4$, in which $Z3$ is the number of teeth of the clutch wheel and $Z4$ is the number of teeth or entrances on the adjustment screw.

In a preferred embodiment of the invention the one-way clutch is configured so that at its closure it can create at least the above-explained rotation of the clutch wheel without having been close to overriding on its own teeth just before, i.e. just before both toothed surfaces of the one-way clutch, which are relatively moveable against each other, are sliding by one circumferential tooth position. Overriding corresponds to a rotation of the adjustment screw in relation to the pinion of $360/Z2$ degrees, whereas $Z2$ is the number of teeth of the one-way clutch.

Thus, this means for one rotation of the adjustment screw that $360/Z2$ degrees=$U*360/(2*Z1)$ degrees applies, by which the relation of the numbers of teeth is as follows:

$$Z2=2*Z1/U \tag{1}$$

The number $Z2$ of teeth of the one-way clutch thus should be the double of the number $Z1$ of teeth of the conical clutch in relation to the gear ratio between the clutch wheel and the adjustment screw.

If the one-way clutch comes close to overriding the contact areas between the teeth become very small and the risk of tooth breakage and excessive wear substantially increases. For that reason, the number of teeth $Z2$ of the one-way clutch should be less than as defined in the equation (1) above, that is why according to the invention the number of teeth $Z2$ shall be preferably 75% of it and most preferably 50% of it. By that it is ensured that overriding in the one-way clutch is avoided with good margins at all adjustments steps, arriving from normal lining wear.

To ensure that the one-way clutch is self-closing, the torque produced by the spring force from the spring element acting on the one-way clutch, which, according to the invention, acts on the teeth surfaces comprising a defined slope, shall overcome all friction torques, which act on the adjustment screw against the desired closing rotation.

Such friction torques, for example, can be calculated from the driving torque of the one-way clutch, from the axial friction force between the pinion and the driver and as well from the friction torques entirely generated by the spring elements in the system.

According to the invention, it is of no significance if the one-way clutch closes during brake application after the conical clutch has opened or if the one-way clutch closes during brake release before the conical clutch closes. It is sufficient that the suggested solution according to the invention ensures that closing of the one-way clutch is delayed until brake release so that the friction torques appearing on the clutch wheel and to a certain extent the frictions occurring on the adjustment screw will assist the closing of the one-way clutch instead of resisting it, by which the accuracy and reliability of the adjustment device is further increased. Such friction contributions can be ignored in the torque analysis.

Such analysis should be conducted for each peculiar construction of a brake lever according to the invention subject to manufacturing tolerances, to the friction pairings to be expected and perhaps to some experiments for dimensioning of single components, in order to ensure that according to the invention the slope angle of the teeth of the one-way clutch is selected such that it always can be shifted to its completely closed position as long as the first clutch remains in an open position.

As explained above, the parameters to be considered for such an analysis, among others, include the driving torque generated by the one-way clutch, the friction force between the pinion and the driver and the friction forces induced by the spring elements, which altogether can be calculated.

The driving torque produced by the one-way clutch can be calculated as $$M_d = R_t * (F_s - F_d) * \tan(\alpha - \arctan(\mu)) \tag{2}$$

where
R_t=mean radius of teeth contact,
F_s=axial spring force acting on the one-way clutch,
F_d=axial friction force between pinion and driver,
α=teeth slope angle, and
μ=friction coefficient in teeth contact.

The friction force between the pinion and the driver can further be calculated as:

$$F_d = \mu^*(M_d + M_a)/R_d \quad (3)$$

where
$M_a$=additional torque acting on the driver (which for example can be generated by a torsion spring as this e.g. is known from EP 0 598 290 B1 of the applicant),
$R_d$=radius of the ridges and grooves in the driver-to-pinion engagement, and
μ=friction coefficient between the driver and the pinion, whereby it is assumed that it is equal to the friction coefficient in the teeth contact.

By combining equations (2) and (3), one gets $$M_d = R_t^*(F_s - \mu^*(M_d + M_a)/R_d)^* \tan(\alpha - \arctan(\mu)) \quad (4),$$

which is equivalent to $$M_d = R_t^*(F_s - \mu^*(M_a/R_d))^* \tan(\alpha - \arctan(\mu))/(1 + \mu^*(R_t/R_d)^* \tan(\alpha - \arctan(\mu))) \quad (5).$$

The friction torques arriving from the single spring elements in the assembly can be calculated for each actual contact surface as $$M_f = F_f^* \mu_f^* R_f \quad (6)$$

where
$F_f$=axial spring force acting on the actual contact,
$\mu_f$=friction coefficient in the actual contact, and
$R_f$=mean radius of the actual contact.

Starting from the calculation possibilities resulting from the above-identified equations (2) to (6), these friction torques, which may counteract the closing of the one-way clutch according to the invention, can be calculated in more detail. The driving torque $M_d$ should always be larger than the sum of all friction torques $M_f$. Insofar that these friction torques shall not become below a certain value for other purposes, these friction torques $M_f$ thus should, wherever possible, be further reduced or even completely eliminated by appropriate measures with respect to design and dimensioning.

BRIEF DESCRIPTION OF THE DRAWINGS

Further advantages and features of the invention do become apparent from the description of the embodiments as shown in the accompanying drawings.

DETAILED DESCRIPTION OF THE INVENTION

Figure 1:
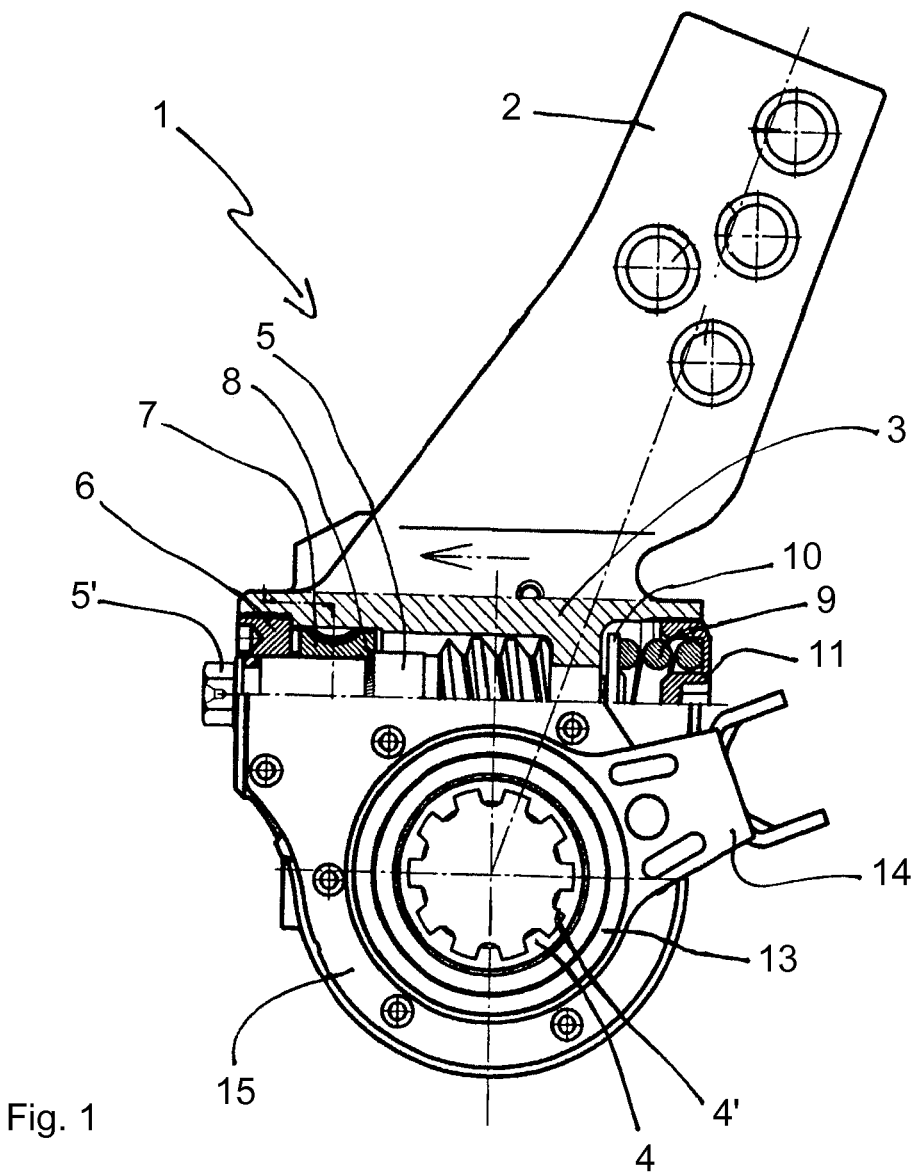
FIG. 1 shows in partly cross-section an example of a brake lever for a drum brake according to the prior art.

FIG. 1 shows a brake lever for a drum brake according to the prior art, as it is e.g. known from EP 1 064 472 B1 of the applicant.

The brake lever 1 is divided into an upper lever section 2 for connection with a brake cylinder (not shown) and a lower housing section 3 for attachment to a splined S-cam shaft (also not shown).

The housing section 3 is for receiving the adjustment mechanism which includes a rotatable worm wheel 4 which comprises a profile with internal splines 4' for cooperation with a splined S-cam shaft. In engagement with this worm wheel 4, a worm screw 5 is provided which is rotatably arranged in the housing section 3 and perpendicular thereto.

Figure 2:
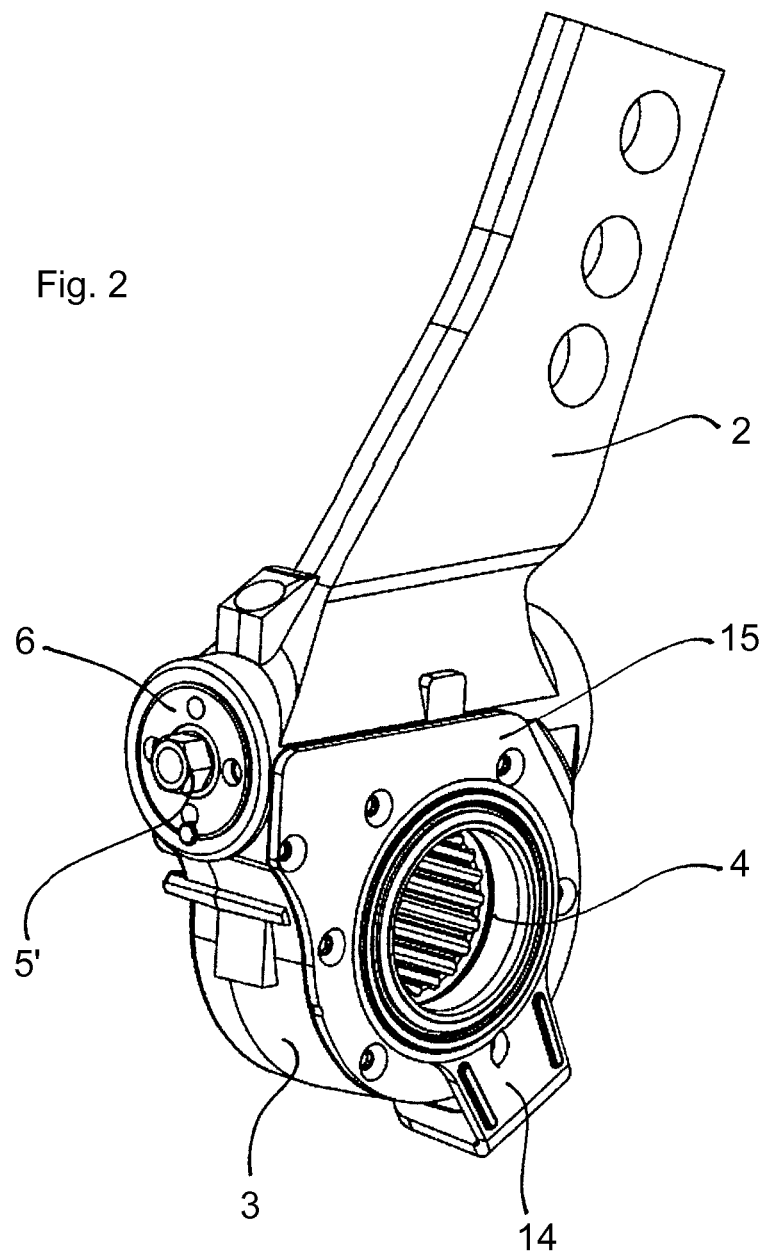
FIG. 2 is a perspective view of a brake lever for a drum brake.

The end of the worm screw 5 (at the left side in FIG. 1) extends from the housing section 3 to the outside and the worm screw 5 is here provided with a hexagonal tool grip 5', as also shown in FIG. 2, for manual rotation of the worm screw 5. At this end, there is a cover 6 threaded into the housing section 3 around the worm screw 5.

A clutch wheel 7 is rotatably mounted on the worm screw 5 and at one side supported against the cover 6. At the opposite side, toothed surfaces 8 with number Z1 of teeth cooperating with each other are provided both on the clutch wheel 7 and on the worm screw 5, which together form a first clutch K1. Since the opposite surfaces 8 provided with teeth Z1 are conically formed which, however, is not obligatory, the first clutch K1 is also referred to as a so-called conical clutch.

In the presentation of FIG. 1 the worm screw 5 is biased to the left by means of a strong compression spring 9 so that engagement with the conical clutch K1 is enabled. The compression spring 9 is arranged between a spring washer 10 at the end of the worm screw 5 and a spring cover 11 threaded into the housing section 3.

Figure 3:
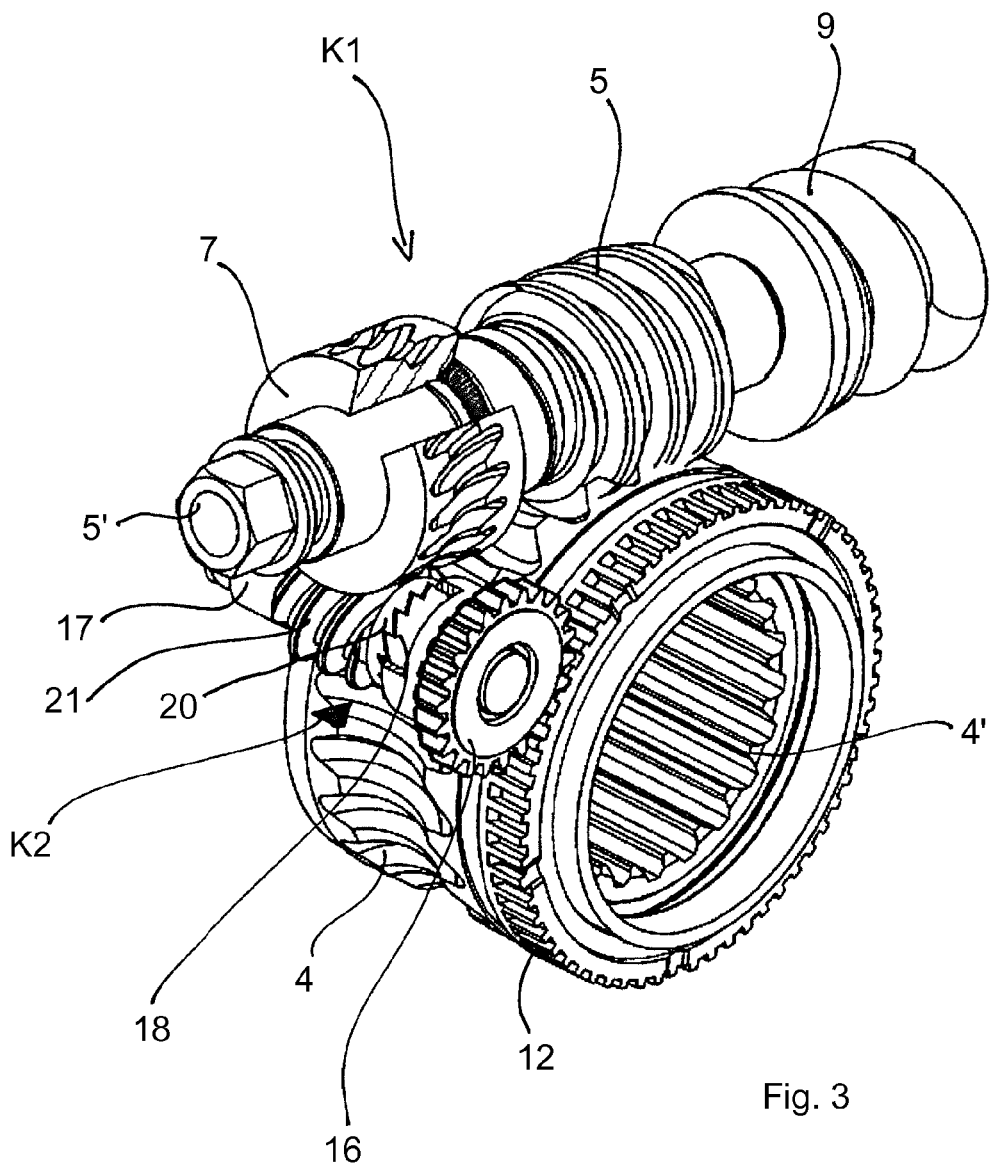
FIG. 3 is a perspective view of the internal, rotatable components of the adjuster.

A control arrangement 12 to 14 is arranged in the same opening of the housing section 3 as the worm wheel 4, but is not connected thereto. The control arrangement comprises a rotatable control disc 12, which has a toothed periphery, as can be seen in FIG. 3. The control disc 12 is provided with an external control ring 13 having a control arm 14 extending therefrom. A plain cover 15 is arranged between the control disc 12 and the control ring 13 and is screwed onto the housing section 3 for rotatable support of the entire control arrangement. The control arm 14 is connected to a fixed rigid part of the vehicle chassis on which the brake lever 1 is pivotably mounted. The purpose of the control arrangement is to provide a reference or control signal for the brake lever 1, as will be explained below.

Figure 6:
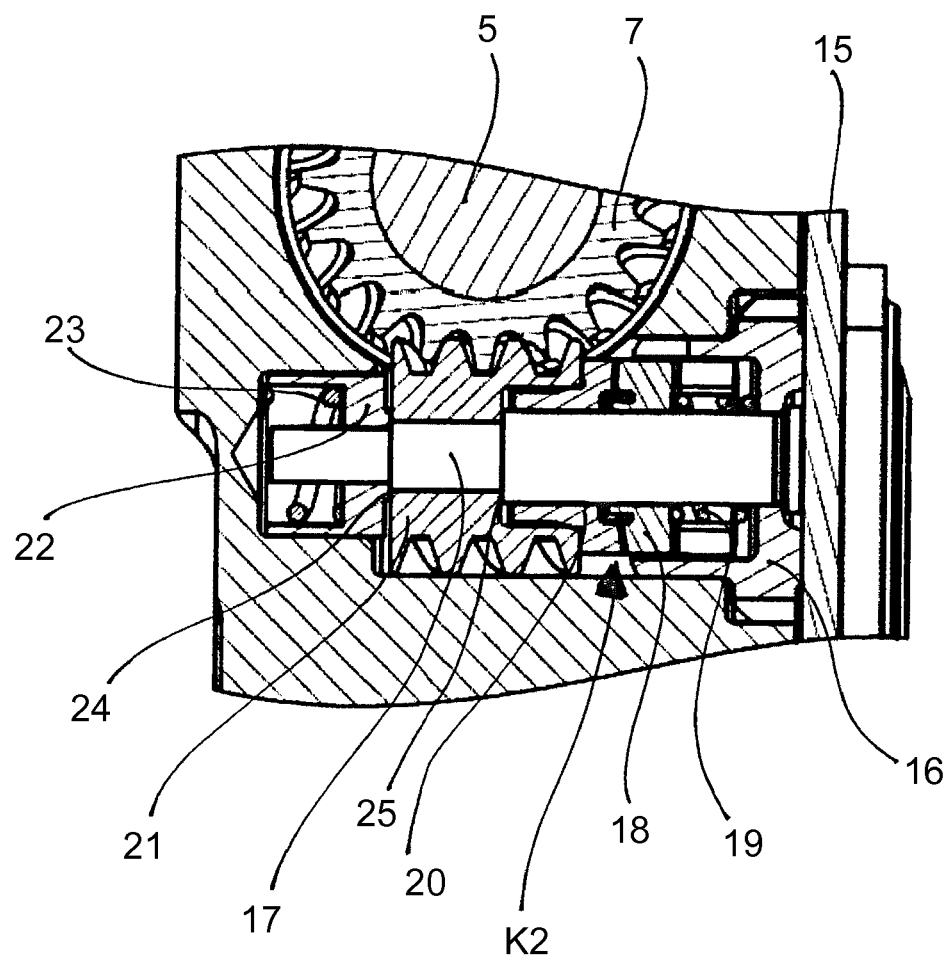
FIG. 6 is a view in partly cross-section of the adjuster as shown in FIG. 3 according to the invention.

As can be seen from FIGS. 3 to 6, a pinion 16, which is rotatably mounted on a shaft 17 in the housing section 3, is meshing with the toothed periphery of the control disc 12. The pinion 16 is hollow and receives inside a driver 18, which is slideably but non-rotatably arranged inside the pinion 16, e.g. by means of a splined connection, so that the driver 18 is movable relative to the pinion 16. A compression spring 19 between the pinion 16 and the driver 18 sets the driver 18 under pretension to the left of the view as shown in FIG. 6.

An intermediate tooth washer 20 is moveably arranged on the shaft 17 to the left of the driver 18. Surfaces provided with a number Z2 of teeth, which are facing each other on the driver 18 and on the intermediate washer 20, do form together a second clutch K2, which is configured as an one-way clutch and which is shown in FIGS. 3 to 6 in its engagement, i.e. in its completely closed position.

An adjustment screw 21 being in engagement with the clutch wheel 7 on the worm screw 5 is arranged at the intermediate washer 20 so as to be rotatable with it as a unit, in which a splined blind connection between these components can be used. Alternatively, it is also possible to provide the adjustment screw 21 and the intermediate washer 20 as one single element.

In the embodiment shown of FIG. 6 which discloses an adjustment device which uses a rotary control distance, as this, for example, is realized in EP 0 598 290 B1 of the applicant, to which it is explicitly referred herewith, the shaft 17 is set under pretension by means of a spring washer 22 arranged on it, in that a spring element 23 is supported between the spring washer 22 and a housing bore in the housing section 3. The spring element 23, preferably a compression screw spring, is made relatively strong in order to keep the entire arrangement on and around the shaft 17 free of vibrations and in a correct alignment and position even at very large manufacturing tolerances. For that purpose, the spring washer 22 is supported against a first abutment 24 of the shaft 17. The adjustment screw 21 in turn is supported against a second abutment 25 of the shaft 17. In that the axial length of the adjustment screw 21 will be dimensioned a bit shorter than the axial distance between both abutments 24 and 25, the left-side spring element 23 does not apply a force onto the adjustment screw 21, so that only the compression spring 19 introduces a force into the adjustment screw 21 in order to keep the one-way clutch K2 under a corresponding bias and pretension.

This spring force realizing the pretensioning is smaller than the spring force of the spring element 23 so that thereby the restricted friction torque can be reduced, in that the abutment 24 being on the left outer side can be located at a corresponding position on the shaft 17.

In order to always ensure according to the invention that the one-way clutch K2 is self-closing, the latter comprises either a slope angle inclination of the teeth Z2 which is made larger as this has been the case in the prior art, or the spring force for the pretensioning of the clutch K2 of the compression spring 19 is also made stronger as this has been practiced up to now, when compared to one-way clutches having been employed with brake levers for drum brakes recently.

This dimensioning of the slope angles of the teeth Z2 and/or of the spring element 19 can result in that the one-way clutch K2 generates a larger driving torque at the beginning of the brake actuation, which is not desired, since this increased driving torque will be transmitted onto the worm screw 5 via the clutch wheel 7 and the conical clutch K1 and could effect that the worm screw 5 will first be rotated in a direction which corresponds to an increase of the lining clearance or slack at the brake pads.

In particular in order to avoid this undesired rotation it is provided according to the invention that the spring washer or washer 10 between the compression spring 19 and the worm screw 5 is arranged and designed in such a way that exactly such a defined brake friction torque is applied onto the worm screw 5, which is able to prevent such rotation.

Figure 4:
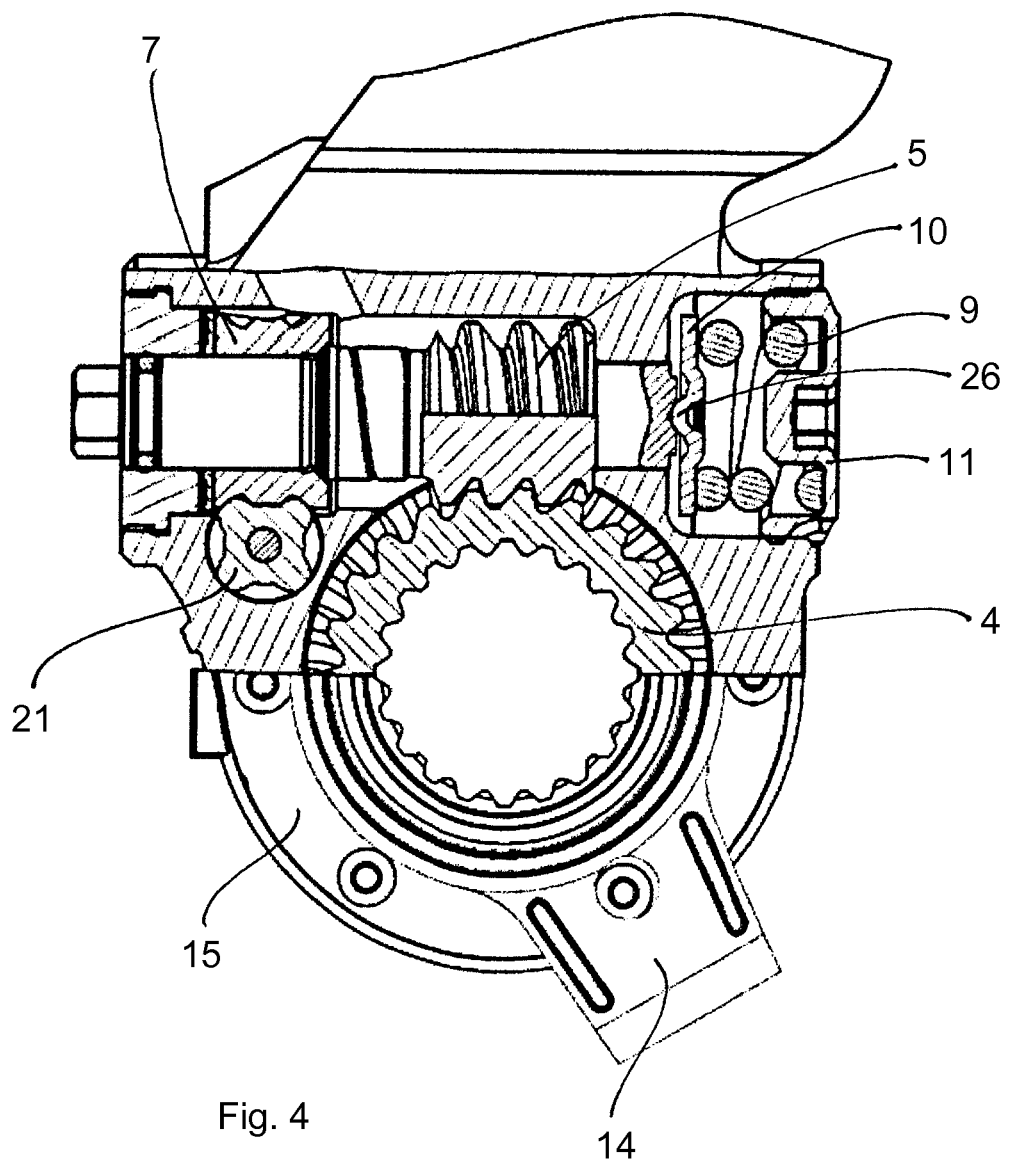
FIG. 4 is a view in partly cross-section of a first embodiment of the adjuster according to the invention.
Figure 5:
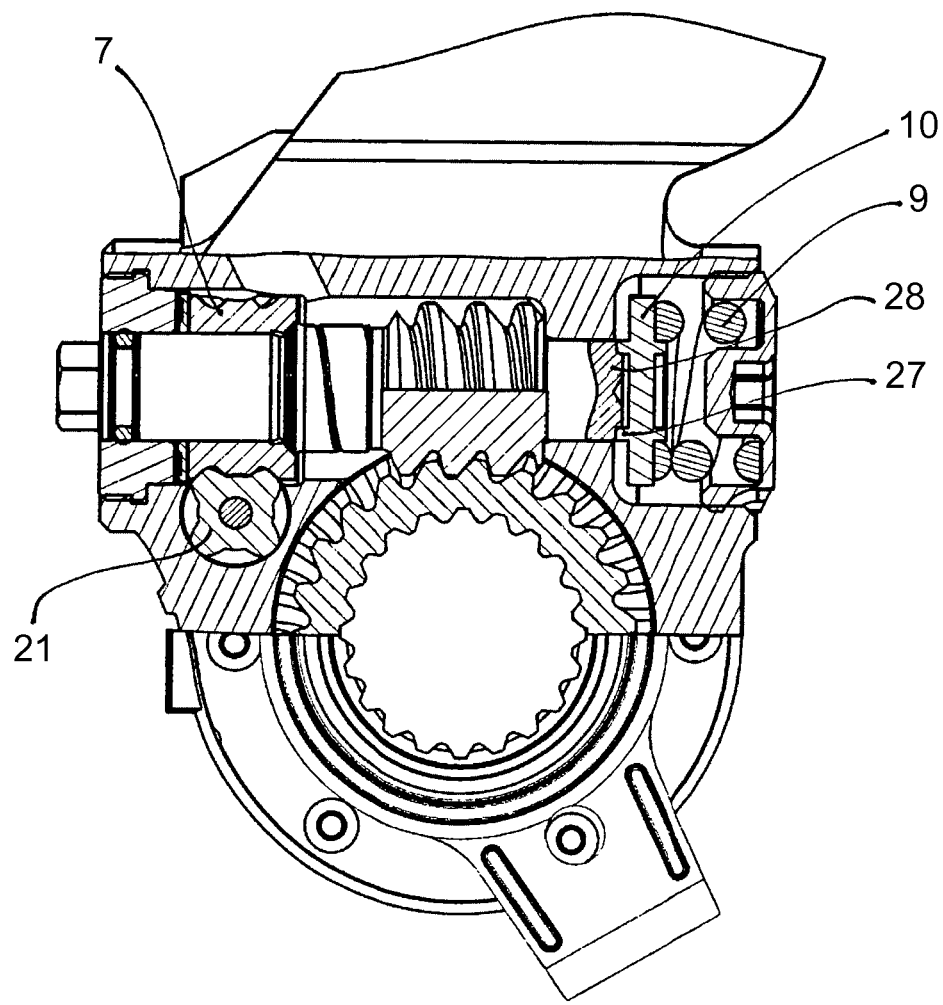
FIG. 5 is a view in partly cross-section of a second embodiment of the adjuster according to the invention.

As can be seen in the embodiment shown in FIG. 4, the washer 10 is formed in such a way that it cooperates with the front-side end of the worm screw 5 via a conical surface 26. Alternatively, the washer 10 can comprise such a contact surface that the contact and therewith the force introduction into the worm screw 5 is limited to a radius which almost corresponds to the diameter of the support of the worm screw 5, i.e. its diameter at the left-side end with which the worm-screw 5 is rotatably supported in a bore of the housing section 3. For that purpose, the washer 10, for example, comprises a protruding ring 27 which surrounds a circumferential nose 28 at the front-side end of the worm screw 5.

What is claimed is:

1. A brake lever for drum brake of a vehicle comprising:
a lever section for connection with a brake cylinder;
a housing section for attachment to a splined S-cam shaft; and
an adjustment device received in said housing section, the adjustment device comprising a first clutch (K1), the first clutch (K1) being biased by a first spring element with a spring force, and a second clutch (K2) formed as a one-way clutch with a number of teeth (Z2), the second clutch (K2) being biased by a second spring element with a spring force;
characterized in that the teeth (Z2) of the second clutch (K2) have a slope angle and the second spring element is configured to apply the spring force, the slope angle and the spring force of the second spring element being tuned relative to each other so that the second clutch (K2) generates a driving torque ($M_d$) which is always larger than a sum of all friction forces ($M_f$) which are induced into the adjustment device by friction, the driving torque ($M_d$) shifting the second clutch (K2) into a completely engaged position as long as the first clutch (K1) remains in a disengaged position.

2. The brake lever according to claim 1, in which the adjustment device comprises a worm wheel for connection with the splined S-cam shaft and a worm screw in engagement with the worm wheel, the worm screw comprising a clutch wheel rotatably mounted on it, which is in engagement with the worm screw by means of the first clutch (K1) under application of the spring force of the first spring element, in which a control arrangement is provided which transmits a control movement onto the clutch wheel subject to the angular position of the brake lever in relation to a fixed reference point, and in which the control arrangement comprises the second clutch (K2).

3. The brake lever according to claim 2, in which the control arrangement comprises a control disc being rotatable arranged coaxially to the worm wheel and connected to a control ring which comprises a control arm which is connected to a fixed part of the vehicle chassis for defining the reference point, a pinion being in engagement with the control disc by means of a gear toothed connection, and an adjustment screw being arranged coaxially to the pinion and connected to the clutch wheel by means of a gear toothed connection, in which the axis of the worm screw is directed perpendicular to the common axis of the pinion and the adjustment screw.

4. The brake lever according to claim 1, in which the adjustment device comprises a worm wheel and a worm screw in engagement with the worm wheel, the worm screw comprising a clutch wheel rotatably mounted on it, and the first clutch (K1) comprises a number of teeth (Z1) on conical surfaces of both the worm screw and the clutch wheel.

5. The brake lever according to claim 4, in which a control arrangement is provided which transmits a control movement onto the clutch wheel subject to the angular position of the brake lever in relation to a fixed reference point, the control arrangement comprising the second clutch (K2) and an adjustment screw connected to the clutch wheel by means of a gear toothed connection, the number of teeth (Z2) of the second clutch (K2) is smaller than $2 \times Z1/U$, where U is a gear ratio between the clutch wheel and the adjustment screw.

6. The brake lever according to claim 1, in which the adjustment device comprises a worm wheel and a worm screw in engagement with the worm wheel, the worm screw comprising a clutch wheel rotatably mounted on it, and the first spring element applies the spring force via a washer onto the end of the worm screw, in which the washer is configured in such a way that the force contact is restricted to a conical surface and/or to a radius which almost corresponds to a support diameter of the worm screw.

7. The brake lever according to claim 1, in which a control arrangement is provided which transmits a control movement onto the clutch wheel subject to the angular position of the brake lever in relation to a fixed reference point, the control arrangement comprising the second clutch (K2) and an adjustment screw connected to the clutch wheel by means of a gear toothed connection, the spring force acting onto the adjustment screw is only provided by the spring force acting onto the second clutch (K2).

8. The drum brake for a vehicle, in particular for a heavy road vehicle, comprising the brake lever for the splined S-cam shaft according to claim 1.

9. The brake lever according to claim 5, in which the number of teeth (Z2) of the second clutch (K2) is smaller than 1.5×Z1/U.

10. The brake lever according to claim 5, in which the number of teeth (Z2) of the second clutch (K2) is smaller than 1.0×Z1/U.

11. The brake lever according to claim 3, in which the first clutch (K1) comprises a number of teeth (Z1) on conical surfaces of both the worm screw and the clutch wheel.

12. The brake lever according to claim 11, in which the number of teeth (Z2) of the second clutch (K2) is smaller than 2×Z1/U, where U is a gear ratio between the clutch wheel and the adjustment screw.

13. The brake lever according to claim 11, in which the number of teeth (Z2) of the second clutch (K2) is smaller than 1.5×Z1/U, where U is a gear ratio between the clutch wheel and the adjustment screw.

14. The brake lever according to claim 11, in which the number of teeth (Z2) of the second clutch (K2) is smaller than 1.0×Z1/U, where U is a gear ratio between the clutch wheel and the adjustment screw.

15. The brake lever according to claim 3, in which the spring force acting onto the adjustment screw is only provided by the spring force acting onto the second clutch (K2).

* * * * *